(12) United States Patent
Park et al.

(10) Patent No.: US 11,942,121 B2
(45) Date of Patent: Mar. 26, 2024

(54) ANCHORING STRUCTURE FOR IMPROVED STRUCTURAL DYNAMICS OF ACTUATORS IN A MULTI-ACTUATOR HARD DISK DRIVE

(71) Applicant: Western Digital Technologies, Inc., San Jose, CA (US)

(72) Inventors: Jung-Seo Park, San Jose, CA (US); Siddhesh Vivek Sakhalkar, Milpitas, CA (US); Thomas J. Hitchner, San Martin, CA (US); Arman V. Golgolab, Los Altos, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 18/206,046

(22) Filed: Jun. 5, 2023

(65) Prior Publication Data
US 2024/0038262 A1 Feb. 1, 2024

Related U.S. Application Data

(60) Provisional application No. 63/392,817, filed on Jul. 27, 2022.

(51) Int. Cl.
*G11B 5/48* (2006.01)
*G11B 25/04* (2006.01)

(52) U.S. Cl.
CPC .......... *G11B 5/4813* (2013.01); *G11B 5/4833* (2013.01); *G11B 25/043* (2013.01)

(58) Field of Classification Search
CPC .... G11B 5/4813; G11B 5/4833; G11B 25/043
See application file for complete search history.

(56) References Cited

U.S. PATENT DOCUMENTS

| | | |
|---|---|---|
| 5,223,993 A | 6/1993 | Squires et al. |
| 6,005,743 A | 12/1999 | Price et al. |
| 6,034,834 A | 3/2000 | Yoshikawa et al. |
| 6,121,742 A | 9/2000 | Misso |
| 6,449,130 B1 | 9/2002 | Koyama |
| 6,490,138 B1 | 12/2002 | Prater |

(Continued)

FOREIGN PATENT DOCUMENTS

WO WO2010107395 A1 9/2010

OTHER PUBLICATIONS

Anonymous, Dual Actuator tuned mass damper pivot bearing, ip.com, Feb. 1, 2000, 1 page, ip.com disclosure No. IPCOM000013589D, IBM, US.

(Continued)

*Primary Examiner* — Brian E Miller
(74) *Attorney, Agent, or Firm* — John D. Henkhaus

(57) ABSTRACT

A multi-actuator hard disk drive includes a lower actuator with a corresponding voice coil motor assembly (VCMA) including a magnet coupled with a first magnet housing plate, a coaxial upper actuator with a corresponding VCMA including a magnet coupled with a second magnet housing plate, and a central support plate mechanically fastened to an enclosure base, at one or more locations, and positioned between the first magnet housing plate of the first VCMA and the second magnet housing plate of the second VCMA. Thereby, the pivot and VCM tilt and the coil torsion modes of the direct plant transfer function are minimized and the peak-to-peak gain in the coil torsion mode of the coupled plant transfer function is reduced.

20 Claims, 7 Drawing Sheets

(56) References Cited

U.S. PATENT DOCUMENTS

| | | | |
|---|---|---|---|
| 6,560,075 B2* | 5/2003 | Price | G11B 5/4813 |
| 6,563,657 B1 | 5/2003 | Serrano et al. | |
| 6,687,092 B2 | 2/2004 | Kan et al. | |
| 10,186,286 B2 | 1/2019 | Keshavan | |
| 10,276,194 B2 | 4/2019 | Keshavan et al. | |
| 10,891,980 B1* | 1/2021 | Keshavan | G11B 25/043 |
| 2002/0149884 A1* | 10/2002 | Price | G11B 5/4813 |
| 2018/0374513 A1* | 12/2018 | Keshavan | G11B 5/4813 |
| 2022/0406332 A1* | 12/2022 | Ma | G11B 5/4813 |

OTHER PUBLICATIONS

Anton Shilov, Seagate's Multi Actuator Technology to Address HDD IOPS Woes, AnandTech, Dec. 29, 2017, 6 pages, downloaded from https://www.anandtech.com/show/12169/seagates-multi-actuator-technology-to-double-hdd-performance.

Cobb, Mike, Seagate Multi Actuator Technology: Data Recovery, Michael Collins DriveSavers Blog, Jan. 25, 2018, 8 pages, DriveSavers Data Recovery, downloaded at https://drivesaversdatarecovery.com/seagate-multi-actuator-technology-data-recovery/.

Zheng, Jinchuan et al., Feedforward Decoupling Control Design for Dual-Actuator System in Hard Disk Drives, IEEE Transactions on Magnetics, Jul. 2004, pp. 2080-2082, vol. 40, No. 4.

Shah, Prateek et al., Active Vibration Rejection in Multi Actuator Drives: Data Driven Approach (Abstract), Conference: ASME 2019 Dynamic Systems and Control Conference, Oct. 2019, 1 page, downloaded at https://www.researchgate.net/publication/337550057_Active_Vibration_Rejection_in_Multi_Actuator_Drives_Data_Driven_Approach.

* cited by examiner

ANCHORING STRUCTURE FOR IMPROVED STRUCTURAL DYNAMICS OF ACTUATORS IN A MULTI-ACTUATOR HARD DISK DRIVE

FIELD OF EMBODIMENTS

Embodiments of the invention may relate generally to data storage devices such as hard disk drives and particularly to approaches for improving the structural dynamics of the actuators in a multi-actuator hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. However, in recent years the growth in areal density in HDDs has not kept pace with the trends of years past. This has shifted the burden on the mechanics to boost capacity increases by increasing the number of disks within the prescribed form factor. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. The high latencies of large capacity HDDs in a clustered environment, such as in data centers with multiple clustered nodes, limits their appeal due to slower access to stored data. As these HDDs are primarily used for near line storage in data centers in hyper-scale environments, the performance of these high-capacity drives also has to satisfy the IOPs (Input/Output Operations Per Second) density requirements (in some instances, similarly referred to as IOPs/TB) to minimize latency. This has led to the need to develop and implement various means to increase high-capacity HDD performance.

One approach to increasing high-capacity HDD performance is the implementation of multi-actuator systems, in which multiple independently operating actuators are assembled onto a single shared pivot shaft in order to independently and concurrently read from and/or write to multiple recording disks of a disk stack. However, the operation of multiple actuators on a shared pivot shaft structurally couples the vibration modes of the independently operating actuators, leading to the transfer of vibrational energy between actuators systems by way of the shared shaft. That is, operation (i.e., rotary movement) of one actuator generates forces that transfer via the shared shaft to the other actuator(s). This vibration transferred to the other actuator(s) affects the ability of the corresponding read-write transducer (or "head") to efficiently arrive at and to stay on-track, resulting in excessive track mis-registration ("TMR"). TMR limits the performance of HDDs in that an inordinate amount of time is expended trying to position and maintain the head well-centered over a data track (e.g., via servoing). The corresponding read and write operations are effectively delayed as a result, thus reducing overall I/O performance.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
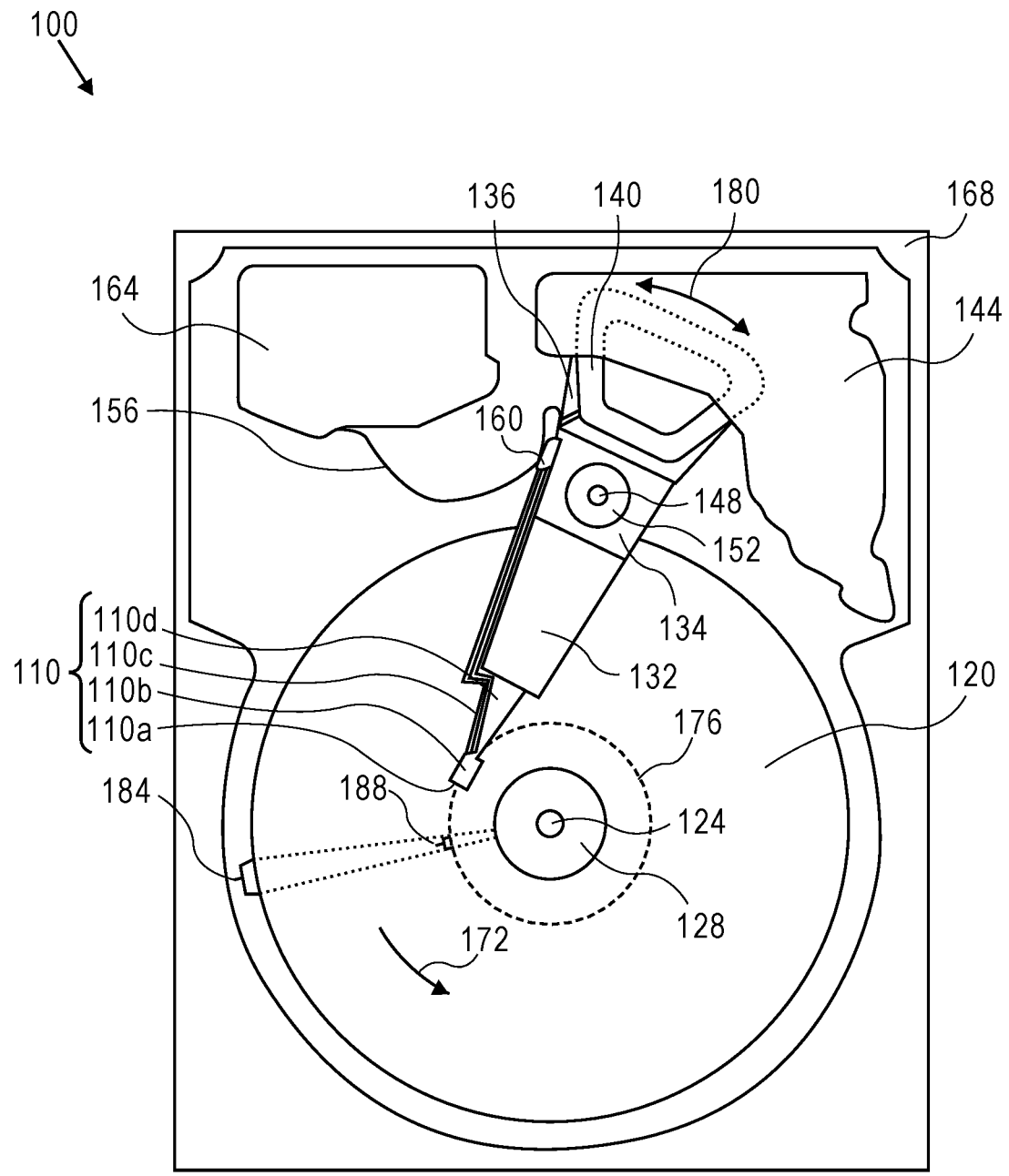
FIG. 1 is a plan view illustrating a hard disk drive (HDD), according to an embodiment.

Generally, approaches to improving the structural dynamics of an actuator system in a multi-actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that in recent history the performance of high-capacity hard disk drives (HDDs) has not necessarily scaled up commensurately with increases in storage capacity, whereby an IOPS/TB (referred to as "IOPS density", where "IOPS" refers to input/output per second) deficit could stand in the way of widespread adoption of such HDDs. This challenge has led to pursuit of multi-actuator systems.

Multi-Actuator System with Sandwiched Central Support Structure

In a multi-actuator HDD, the dynamics of the actuators are strongly coupled. This means that exciting one actuator (by way of seeking) causes resonance modes on the other actuator(s) to be excited as well. The adverse effects of structural dynamics coupling between the actuators in a multi-actuator HDD can be mitigated by providing a laterally stiff interface (i.e., a center plate) between the opposing pivot shafts of the actuator-pivot assemblies. For example, a supporting centerplate may be sandwiched between the VCMA (voice coil motor assembly) and the pivot shafts without any direct attachment to the base, i.e., without the centerplate and base being in direct contact at an attachment location.

Figure 2:
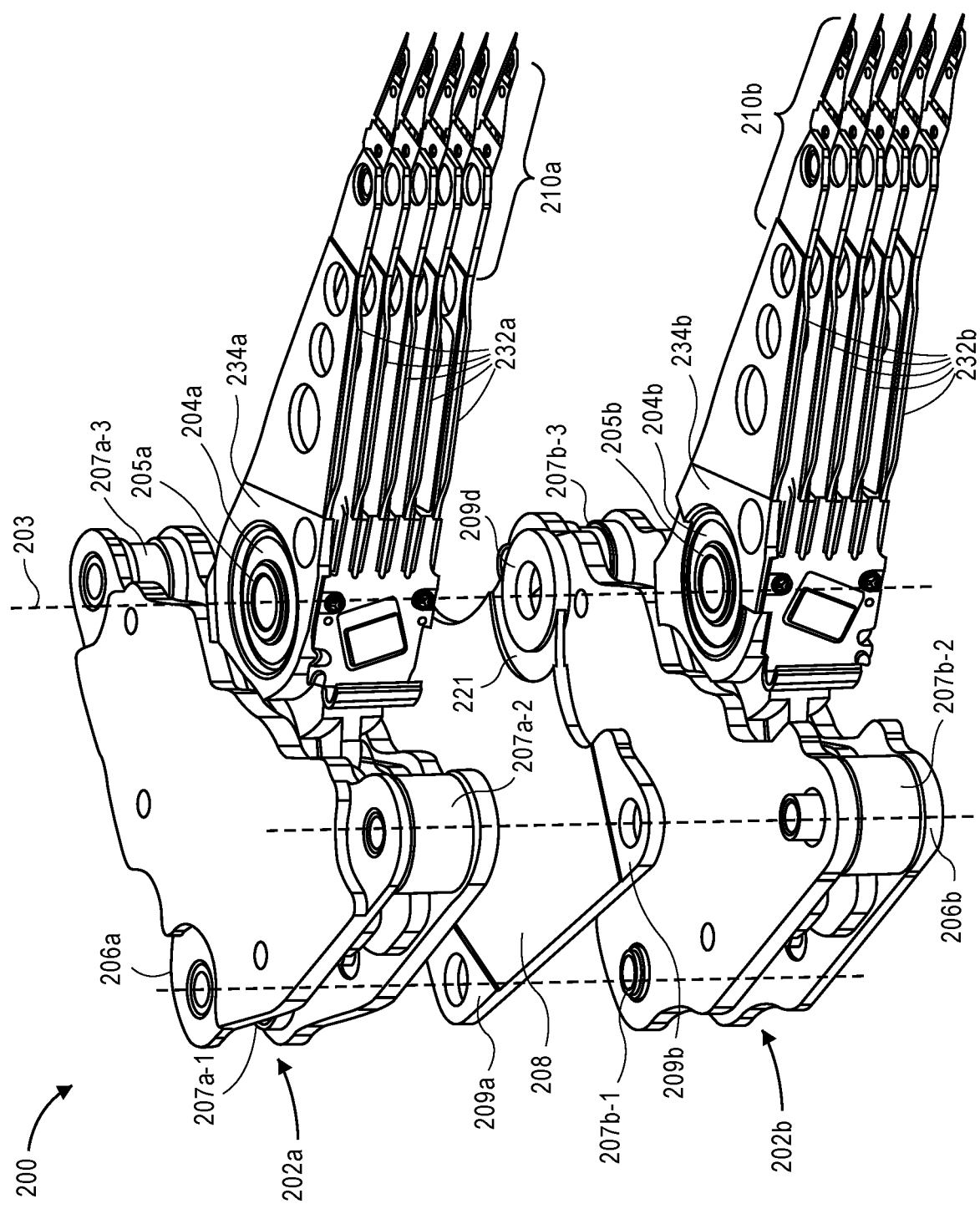
FIG. 2 is an exploded perspective view illustrating a multi-actuator assembly with a central support structure.
Figure 3:
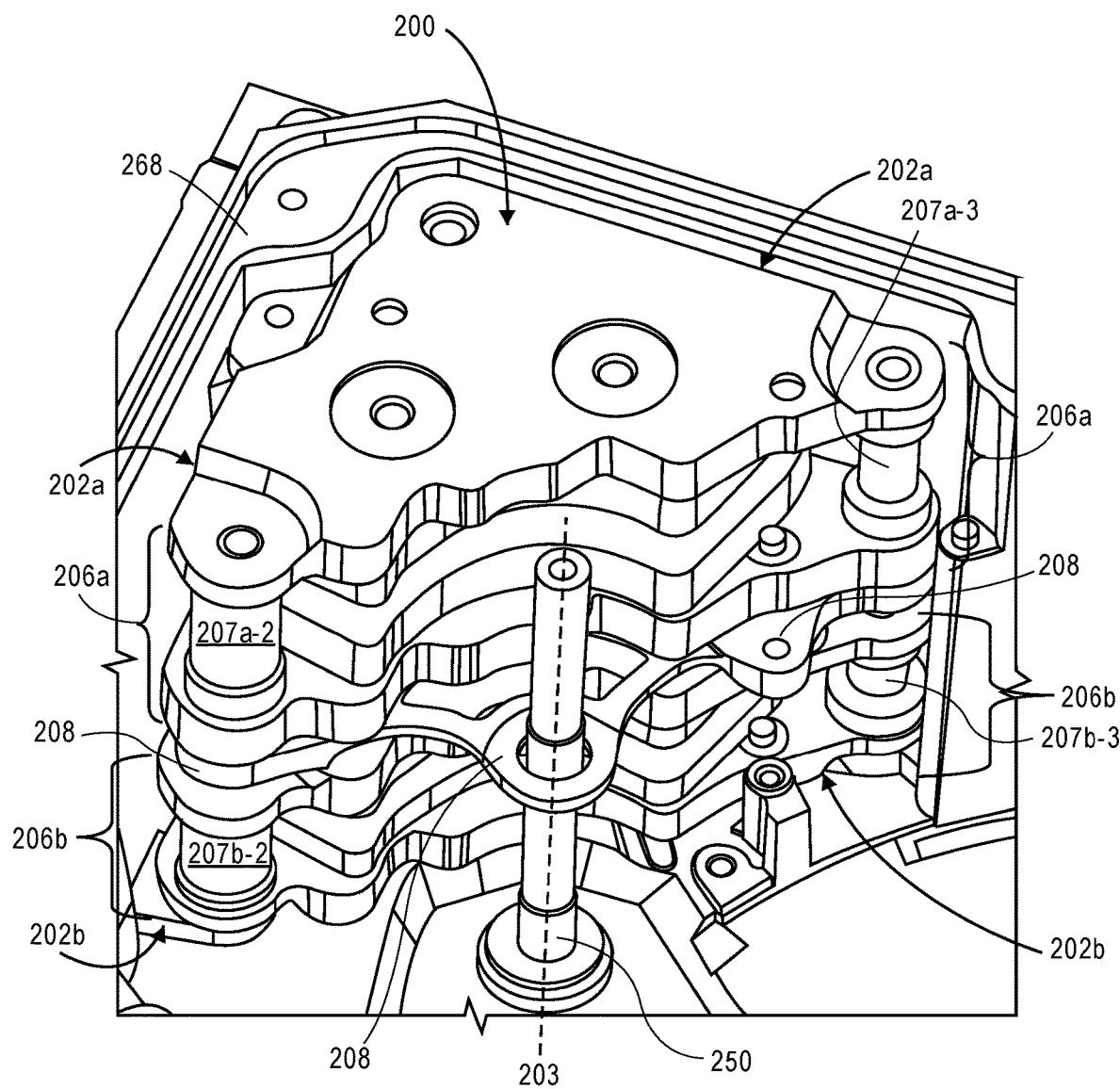
FIG. 3 is a perspective view illustrating another similar multi-actuator system with a central support structure in an installed state, with the actuators removed for clarity.

FIG. 2 is an exploded perspective view illustrating a multi-actuator assembly with a central support structure. FIG. 3 is perspective view illustrating another similar multi-actuator system with a central support structure in an installed state, with the actuators removed for clarity. Here, a hard disk drive comprises a multi-actuator assembly 200 comprising two (for purposes of a non-limiting example) independent actuator systems 202a, 202b, which can be independently optimized, sharing the same rotational axis 203 and capable of concurrently servicing a respective disk stack (see, e.g., a stack of multiple recording media 120 of FIG. 1). Each of the two actuator systems 202a, 202b comprises its own respective pivot bearing assembly 204a, 204b (see, e.g., pivot bearing assembly 152 of FIG. 1), and are physically separate from each other. Each actuator system 202a, 202b also comprises its own voice coil motor assembly (VCMA) 206a, 206b. The two actuator systems 202a, 202b are stacked on top of each other in a modular fashion, with each of the two pivot shafts 205a, 205b (see, e.g., pivot shaft 148 of FIG. 1) engaging a common post 250 that is integrated with the enclosure base 268 (e.g., HDD housing 168 of FIG. 1, also referred to as a Motor Base Assembly (MBA)). Similar to FIG. 1, each actuator system 202a, 202b further comprises a respective carriage 234a, 234b (see, e.g., carriage 134 of FIG. 1), a set or comb of arms 232a, 232b (see, e.g., arm 132 of FIG. 1) coupled therewith, and a set of HGAs 210a, 210b (see, e.g., HGA 110 of FIG. 1) coupled therewith.

In a scenario in which this configuration is not incorporated, the two pivot shafts would be preloaded directly against each other by the clamping action of the cover screw against the pivot shaft as it is screwed into the base post. However, the lateral or sway stiffness at the interface between the pivot shafts may not be high enough to prevent a high gain of tilt and coil torsion modes along with a drop in frequency of the primary mode, i.e., the so-called in-phase butterfly mode (which may also be referred to as the main mechanical system mode or the first principal bending mode of the actuator). This would degrade the system dynamics to the extent of negating the intended performance gains expected from implementing a multi-actuator configuration. Here, a central support structure 208 (or "support plate") is sandwiched (and preferably compressed) between the pivot shafts 205a, 205b of the two actuator-pivot assemblies and also between the two VCMAs 206a, 206b, and provides a high sway (lateral) stiffness interface to overcome the degradation in tilt and in-phase butterfly modes.

The central support structure 208 is sandwiched between the pole pieces of the upper and lower VCMAs 206a, 206b, and makes contact with the poles at three discrete pads 209a, 209b, 209c (not visible here). It uses existing features (holes) in the VCM posts 207a-1, 207a-2, 207a-3, 207b-1, 207b-2, 207b-3 for fasteners that clamp the VCMAs 206a, 206b and the central support structure 208 together. Similarly, the central support structure 208 may have tightly controlled seat surfaces and an associated hole for engaging the base post. The seat surfaces are clamped between the opposing pivot shaft 205a, 205b surfaces using the same attachment scheme as in current capacity enterprise disk drives, e.g., by way of a screw through the HDD cover into the base post.

The forgoing approaches enable the use of independent pivot assemblies (and hence separate pivot shafts) for, in this case, the two actuator assemblies (or simply "actuators"). The adverse effects of structural dynamics coupling between actuators are mitigated by providing a laterally stiff interface (center plate) between the opposing pivot shafts of the actuator assemblies. This increases the frequencies of key structural modes such as tilt and in-phase butterfly modes while also reducing the gains of lower frequency modes such as coil torsion. The addition of dampers may further reduce the gain of problematic VCM modes. While the forgoing configuration works well for 1" (one-inch height) HDDs, it would not be expected to work as well for 2" (two-inch height) HDDs, which have heavier and taller (e.g., effectively doubled) VCMAs, actuators, base walls, and base posts compared to 1" HDDs, which introduces significantly more compliance into the multi-actuator system. For example, modeled use of a sandwiched central support structure in a 2" HDD shows a non-trivial tilt mode and coil torsion mode, leading to multiple low frequency peaks in the plant transfer function.

Multi-Actuator System Having Directly-Attached Central Support Plate

The dynamics of a multi-actuator HDD is characterized by its direct and coupled plant transfer functions. While the direct plant transfer function describes the response of an actuator to its own actuation, the coupled plant transfer function characterizes the response of the secondary actuator(s) to actuation of the primary actuator. The direct plant transfer function of a typical 2" HDD including a sandwiched centerplate shows multiple low frequency peaks (prior to the first system butterfly mode) with large gain and a large head-to-head variation. These low frequency peaks are associated with the tilt mode (involving tilting/rocking motion of pivots, VCMAs, and the enclosure), the coil torsion mode, and arm bending modes. The coupled plant transfer function of a typical 2" HDD also shows these high-gain low-frequency peaks (i.e., pivot and VCM tilt and coil torsion modes) with large head-to-head variation, which can also result in a high cPES (coupled Position Error Signal) response. Thus, challenges remain regarding controlling, managing, mitigating these high-gain low-frequency modes that are either excited directly by the primary actuator or are coupled to the secondary actuator.

Note that the number of actuators that may be assembled onto a shared pivot shaft may vary from implementation to implementation; however, an exemplary but non-limiting dual-actuator arrangement is described throughout herein.

Figure 4:
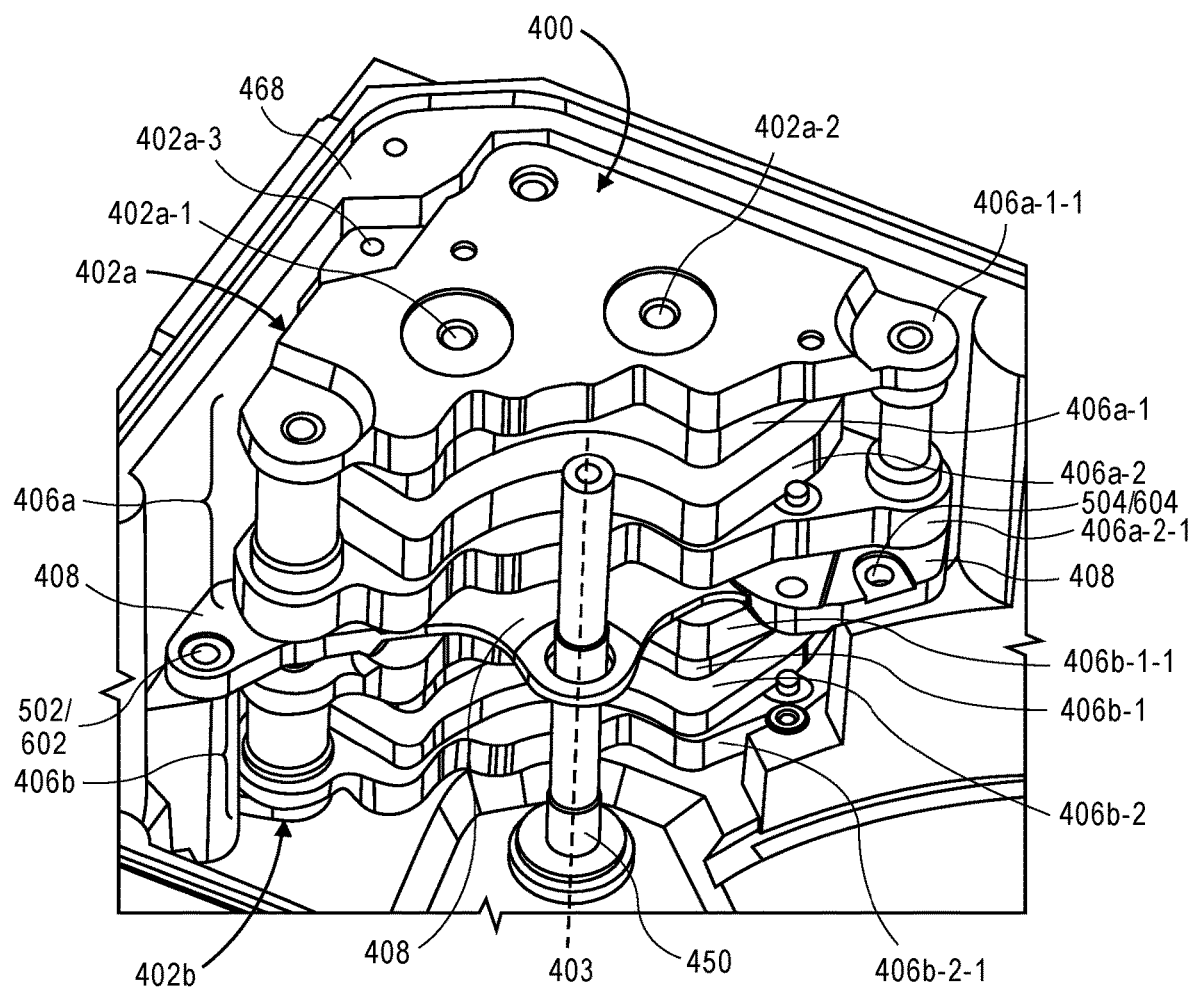
FIG. 4 is a perspective view illustrating a multi-actuator system with a directly-attached centerplate in an installed state, according to an embodiment.

FIG. 4 is perspective view illustrating a multi-actuator system with a directly-attached centerplate in an installed state, according to an embodiment. A hard disk drive comprises a multi-actuator assembly 400 comprising two (for purposes of a non-limiting example) independent actuator systems 402a, 402b, where the HSAs are not shown here for purposes of clarity but are configured similarly as with actuator systems 202a, 202b (FIG. 2). Here, the actuator systems 402a, 402b may be implemented with more arms 232a, 232b (FIG. 2; see also, e.g., arm 132 of FIG. 1) and thus a larger set of HGAs 210a, 210b (FIG. 2; see also, e.g., HGA 110 of FIG. 1) coupled therewith (than with the actuator systems 202a, 202b), sharing the same rotational axis 403 and capable of concurrently servicing a respective disk stack (see, e.g., a stack of multiple recording media 120 of FIG. 1).

Each of the two actuator systems 402a, 402b may comprise its own respective pivot bearing assembly (see, e.g., pivot bearing assembly 204a, 204b of FIG. 2, pivot bearing assembly 152 of FIG. 1), and are physically separate from each other. Each actuator system 402a, 402b also comprises its own voice coil motor assembly (VCMA) 406a, 406b, which each comprises at least one magnet 406a-1, 406a-2, 406b-1, 406b-2 coupled with a respective magnet housing plate 406a-1-1, 406a-2-1, 406b-1-1, 406b-2-1, where the respective voice coil of each actuator (see, e.g., voice coil 140 of FIG. 1) is positioned between the corresponding magnets to form a voice coil motor. The two actuator systems 402a, 402b are stacked on top of each other in a modular fashion, with each of two pivot shafts (see, e.g., pivot shaft 205a, 205b of FIG. 2, pivot shaft 148 of FIG. 1) engaging a common post 450 that is integrated with the enclosure base 468 (e.g., HDD housing 168 of FIG. 1; may also be referred to at times as "enclosure base" or "baseplate" or "Motor Base Assembly" (MBA)). Similar to FIG. 1, each actuator system 402a, 402b further comprises a respective carriage (see, e.g., carriage 234a, 234b of FIG. 2, carriage 134 of FIG. 1), a set or comb of arms (see, e.g., arm 232a, 232b of FIG. 2, arm 132 of FIG. 1) coupled therewith, and a set of HGAs (see, e.g., HGAs 210a, 210b of FIG. 2, HGA 110 of FIG. 1) coupled therewith.

According to an embodiment a central support plate 408 (or "centerplate 408") is positioned between a bottom ("e.g., first") magnet housing plate 406a-2-1 of top VCMA 406a and a top (e.g., "second") magnet housing plate 406b-1-1 of VCMA 406b and, notably, fastened to the enclosure base 468. Thus, centerplate 408 is a separate component or part from each of the magnet housing plate 406a-2-1, 406b-1-1 parts. Direct attachment of the centerplate 408 to the base 468 (and/or to VCM plates) through one or more mechanical fastener (e.g., screws), i.e., where the centerplate 408 and the base 468 are in direct contact at the point or location of attachment, addresses critical actuator dynamics issues in multiple actuator HDDs, by restraining a tilting/rocking motion of the centerplate and, thereby, the VCMAs and HSAs. Hence, a clean direct plant transfer function with minimal low frequency peaks (prior to the first system butterfly mode) is enabled, thereby further enabling a robust servo-controller design. Furthermore, direct attachment in the form of mechanical fastening of the centerplate 408, rather than sandwiching such a support plate structure between two VCMAs, leads to a significant reduction in the coupled plant transfer function gain at low frequencies (again, prior to the first system butterfly mode), including in excess of a 10 dB (decibel) peak-to-peak gain reduction in the coil torsion mode. This is likely to enable a beneficially lower cPES (coupled Position Error Signal) response.

Enclosure Base for Directly-Attached Central Support Plate

According to an embodiment, the centerplate is fastened to the enclosure base with a respective fastener at multiple locations. Experimentation and/or modeling has shown that as the number of attachment points between centerplate 408 and the base 468 is increased, the direct plant transfer function progressively improves commensurately. Hence, direct attachment of the centerplate 408 to the base 468 by way of multiple mechanical fasteners (e.g., screws) at multiple locations, i.e., where the centerplate 408 and the base 468 are in direct contact at the multiple locations of attachment, further beneficially addresses the critical actuator dynamics issues in multiple actuator HDDs. According to an embodiment, the centerplate 408 is fastened with screws directly to the base 468 at three (or more) locations, a configuration found to effectively eliminate or minimize the pivot and VCM tilt and coil torsion modes of the direct plant transfer function, as well as significantly reduce the peak-to-peak gain in the coil torsion mode of the coupled plant transfer function.

Figure 5:
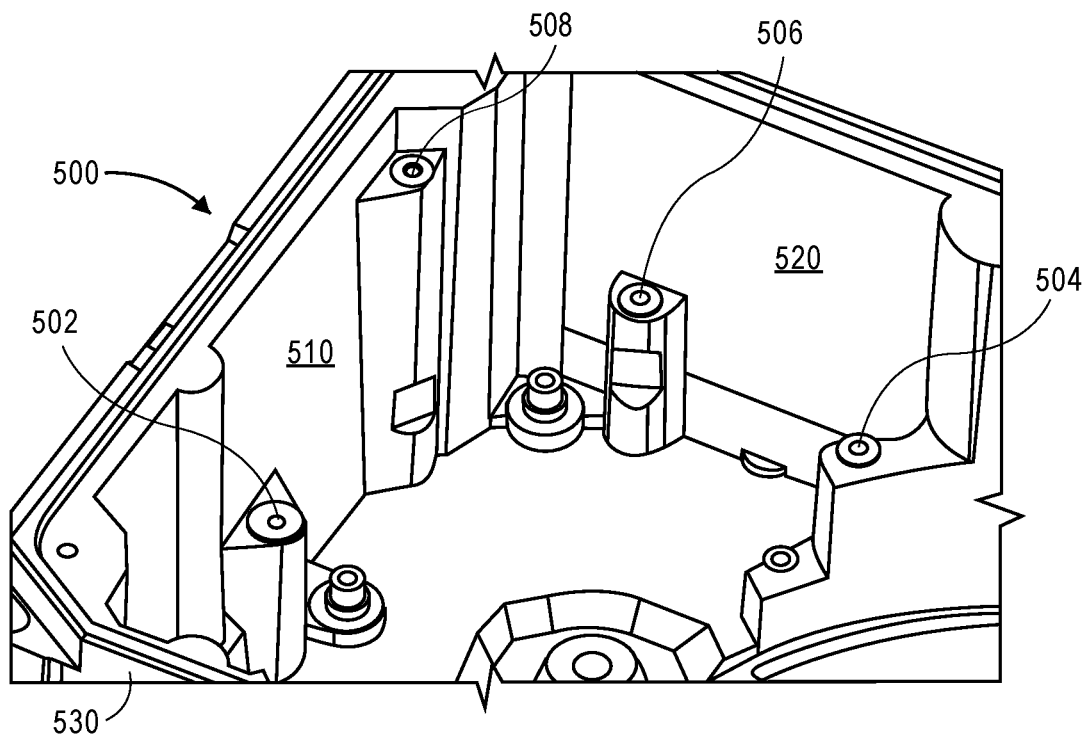
FIG. 5 is a perspective view illustrating an enclosure base for a directly-attached multi-actuator centerplate, according to an embodiment.

FIG. 5 is perspective view illustrating an enclosure base for a directly-attached multi-actuator centerplate, according to an embodiment. FIG. 5 effectively depicts the enclosure base 468 in FIG. 4 with the first and second actuator systems 402a, 402b removed, thereby revealing exemplary centerplate 408-base 468 attachment locations. Base 500 comprises a first base attachment location 502 (or simply "attachment location 502") extending from or part of a first sidewall 510, a second base attachment location 504 (or simply "attachment location 504"), and a third base attachment location 506 (or simply "attachment location 506") extending from or part of a second sidewall 520. As previously described and according to embodiments, one or more of these attachment locations 502, 504, 506 may be implemented, as the number and location of attachment locations may vary from implementation to implementation based, for example, on the particular structural dynamics corresponding to a particular multi-actuator system.

Directly-Attached Central Support Plate

Figure 6A:
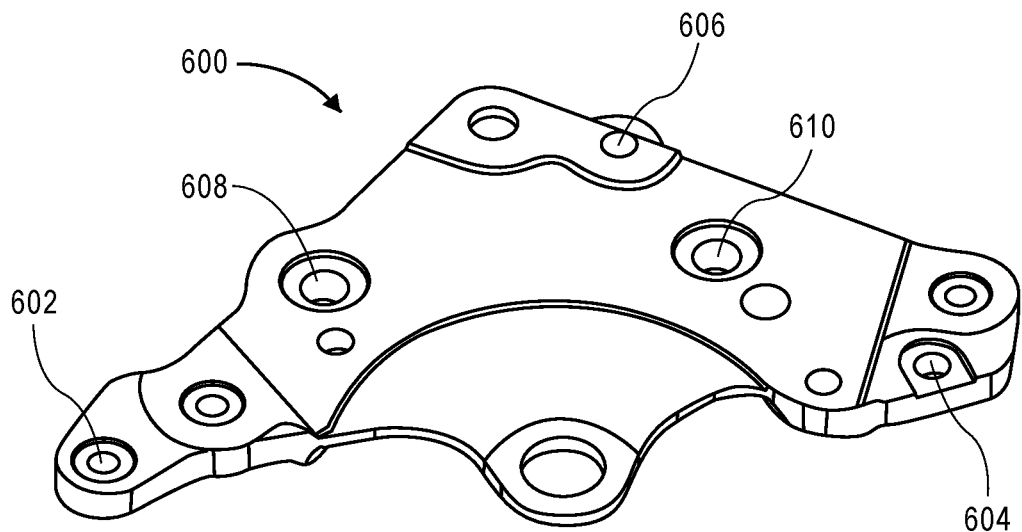
FIG. 6A is a perspective view illustrating a directly-attached multi-actuator centerplate, according to an embodiment.

FIG. 6A is perspective view illustrating a directly-attached multi-actuator centerplate, according to an embodiment. FIG. 6A effectively depicts the centerplate 408 in FIG. 4 by itself with the first and second actuator systems 402a, 402b removed, thereby revealing exemplary centerplate 408-base 468 attachment locations.

As previously described and according to an embodiment, the centerplate 408 is fastened with screws directly to the base 468 at three locations. Likewise, according to an embodiment and in the context of FIGS. 5-6A, centerplate 600 (FIG. 6A) is fastened with mechanical fasteners (e.g., screws) to base 500 (FIG. 5) at three locations. Centerplate 600 comprises a first plate attachment location 602 (or simply "attachment location 602"), a second plate attachment location 604 (or simply "attachment location 604"), and a third plate attachment location 606 (or simply "attachment location 606"). As previously described and according to embodiments, one or more of these attachment locations 602, 604, 606 may be implemented, as the number and location of attachment locations may vary from implementation to implementation based, for example, on the particular structural dynamics corresponding to a particular multi-actuator system. Returning to FIG. 4, two of the visible centerplate 408-base 468 (and/or centerplate 600-base 500) attachment locations are labeled as attachment location 502/602 on the lefthand side and attachment location 504/604 on the righthand side, with the attachment location 506/606 not visible in this view.

In addition to directly fastening the centerplate 408, 600 to the enclosure base 468, 500 as described, according to an embodiment the centerplate 408, 600 is further fastened to the bottom ("second") VCMA 406b (FIG. 4) at one or more locations. For example, centerplate 600 may further comprise two VCMA attachment locations 608, 610, whereby a mechanical fastener (e.g., screw) may be used to directly attach or fasten centerplate 600 to VCMA 406b at one or preferably both locations, thereby providing an incrementally stiffer interface between the multiple actuator systems 402a, 402b (FIG. 4). Furthermore and according to an embodiment, the first VCMA 406a (FIG. 4) may be fastened (e.g., screwed) to a device cover at one or more locations, such as at attachment locations 402a-1 and 402a-2 of FIG. 4, thereby providing an incrementally stiffer multi-actuator assembly 400 (FIG. 4). Still further and according to an embodiment, the first VCMA 406a (FIG. 4) may be fastened (e.g., screwed) to the base 468 at one or more locations, such as at VCMA attachment location 402a-3 of FIG. 4 to base attachment location 508 (FIG. 5), thereby providing an incrementally stiffer multi-actuator assembly 400 (FIG. 4).

Figure 6B:
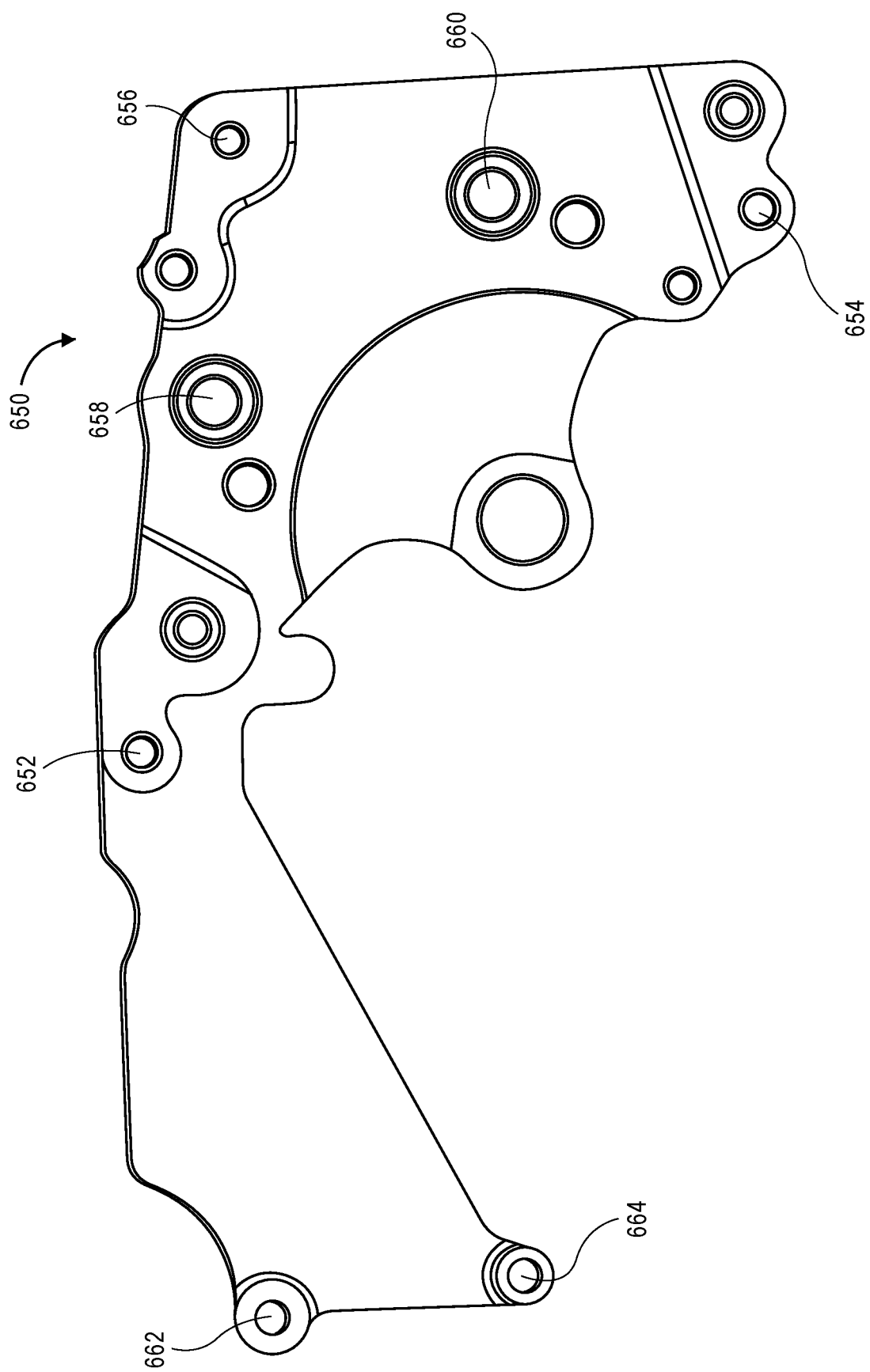
FIG. 6B is a plan view illustrating a directly-attached multi-actuator centerplate, according to an embodiment.

As described, the number and location of attachment locations for a multi-actuator structural support centerplate may vary from implementation to implementation. For example, extending the centerplate to an additional base sidewall may provide additional stiffness to the multi-actuator system. FIG. 6B is a plan view illustrating a directly-attached multi-actuator centerplate, according to an embodiment. Here, for a non-limiting example, centerplate 650 is configured for fastening with mechanical fasteners (e.g., screws) to an HDD enclosure base at more than three locations, thereby differing from centerplate 600 of FIG. 6A. Centerplate 650 comprises, similar to centerplate 600, a first plate attachment location 652 (or simply "attachment location 652"), a second plate attachment location 654 (or simply "attachment location 654"), and a third plate attachment location 656 (or simply "attachment location 656"). However, with centerplate 650 two additional plate attachment locations are provide, i.e., a fourth plate attachment location 662 (or simply "attachment location 662") and a fifth plate attachment location 664 (or simply "attachment location 664"), thereby extending centerplate 650 to an additional adjacent base sidewall such as sidewall 530 (FIG. 5) to provide an incrementally stiffer multi-actuator assembly via attachment to multiple base sidewalls (here, three of the four base sides) or support structures/pillars. Thus, consideration may be given to the number and placement of plate attachment locations based on the amount of stiffness desired for a given multi-actuator system in order to suitably manage the direct and coupled plant transfer functions. Here too, in addition to directly fastening the centerplate 650 to an enclosure base such as base 468, 500, according to an embodiment the centerplate 650 is further fastened to the bottom ("second") VCMA 406b (FIG. 4) at one or more locations. For example, centerplate 650 may further comprise two VCMA attachment locations 658, 660, whereby a mechanical fastener (e.g., screw) may be used to directly attach or fasten centerplate 650 to VCMA 406b at one or preferably both locations, thereby providing an incrementally stiffer interface between the multiple actuator systems 402a, 402b (FIG. 4).

Method for Manufacturing a Multi-Actuator Assembly for Hard Drive

Figure 7:
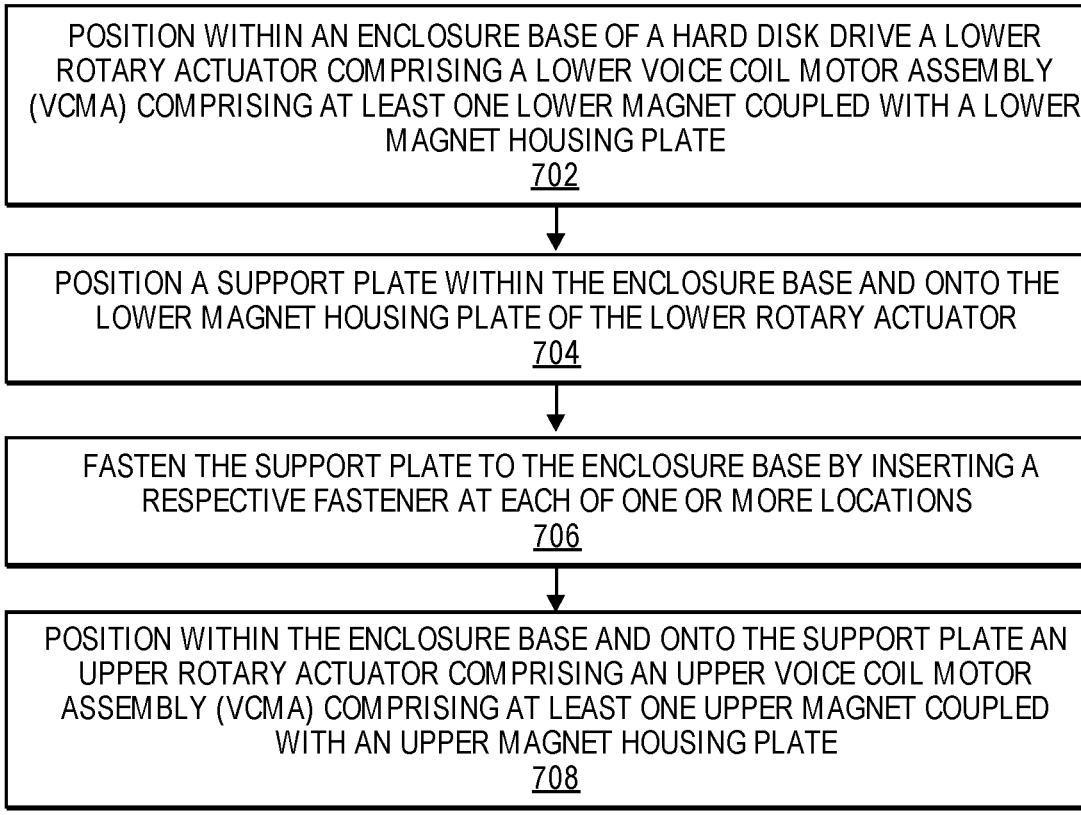
FIG. 7 is a flowchart illustrating a method of assembling a multi-actuator assembly in a hard disk drive, according to an embodiment.

FIG. 7 is a flowchart illustrating a method of assembling a multi-actuator assembly in a hard disk drive, according to an embodiment.

At block 702, position within an enclosure base of a hard disk drive a lower rotary actuator comprising a lower voice coil motor assembly (VCMA) comprising at least one lower magnet coupled with a lower magnet housing plate. For example, lower actuator system 402b (FIG. 4) (including VCMA 406b (FIG. 4) and constituent one or more magnet 406b-1, 406b-2 (FIG. 4) coupled with a respective magnet housing plate 406b-1-1, 406b-2-1 (FIG. 4), as well as the constituent pivot shaft for engaging the post 450 (FIG. 4), and a corresponding carriage, set of arms, and set of HGAs) is positioned within enclosure base 468 (FIG. 4), 500 (FIG. 5) of a hard disk drive such as HDD 100 (FIG. 1).

At block 704, position a support plate within the enclosure base and onto the lower magnet housing plate of the lower rotary actuator. For example, centerplate 408 (FIG. 4), 600 (FIG. 6A), 650 (FIG. 6B) is positioned within enclosure base 468, 500 and onto the magnet housing plate 406b-1-1 of the lower actuator system 402b.

At block 706, fasten the support plate to the enclosure base by inserting a respective fastener at each of one or more locations. For example, centerplate 408, 600, 650 is directly attached to enclosure base 468, 500 by inserting a mechanical fastener such as a screw at each of one or more locations, such as at third plate attachment location 606 (FIG. 6A), 656 (FIG. 6B) into third base attachment location 506 (FIG. 5), i.e., whereby the centerplate 408, 600, 650 and the base 468, 500 mate at a structural interface where the parts are in direct contact with each other at the location of attachment. Such direct attachment is best seen at attachment locations 502/602 and 504/604 of FIG. 4. Alternatively at block 706 one may additionally insert a fastener at the first plate attachment location 602 (FIG. 6A), 652 (FIG. 6B) into the first base attachment location 502 (FIG. 5) and at the second plate attachment location 604 (FIG. 6A), 654 (FIG. 6B) into the second base attachment location 504 (FIG. 5). Here, the centerplate 408, 600, 650 may be further fastened to the lower VCMA 406b at one or more locations such as the VCMA attachment locations 608, 610 (FIG. 6A), 658, 660

(FIG. 6B) thereby providing an incrementally stiffer interface between the multiple actuator systems 402a, 402b.

At block 708, position within the enclosure base and onto the support plate an upper rotary actuator comprising an upper voice coil motor assembly (VCMA) comprising at least one upper magnet coupled with an upper magnet housing plate. For example, upper actuator system 402a (FIG. 4) (including VCMA 406a (FIG. 4) and constituent one or more magnet 406a-1, 406a-2 (FIG. 4) coupled with a respective magnet housing plate 406a-1-1, 406a-2-1 (FIG. 4), as well as the constituent pivot shaft for engaging the post 450, and a corresponding carriage, set of arms, and set of HGAs) is positioned within enclosure base 468, 500 and onto the support plate centerplate 408, 600, 650. If fasteners are not inserted at the first and second plate attachment locations 602, 604, 652, 654 at block 706, then those locations are fastened here, as they are still accessible even after the upper actuator system 402a is positioned onto the centerplate 408, 600, 650. Here, VCMA 406a may be fastened to the base 468, 500 at one or more locations, such as at VCMA attachment location 402a-3 (FIG. 4) to VCMA-base attachment location 508 (FIG. 5), thereby providing an incrementally stiffer multi-actuator assembly 400 (FIG. 4). Further, once an HDD cover is positioned over the base 468, 500, VCMA 406a may be fastened to the cover at one or more locations, such as at attachment locations 402a-1, 402a-2 (FIG. 4), thereby providing an even stiffer multi-actuator assembly 400.

Consequently, providing a stiff interface between the multiple actuator assemblies of the multi-actuator system, via a central support structure/centerplate, is expected to mitigate adverse effects of structural dynamics coupling between the actuator assemblies. This is manifested by minimizing the pivot and VCM tilt and coil torsion modes of the direct plant transfer function thereby enabling a robust servo-controller design, and reducing the peak-to-peak gain in the coil torsion mode of the coupled plant transfer function thereby enabling a beneficially lower cPES (coupled Position Error Signal) response.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
   a plurality of disk media rotatably mounted on a spindle;
   a first head slider comprising a read-write head configured to write to and to read from a first disk medium;
   a first rotary actuator configured to move the first head slider to access portions of the first disk medium via actuation by a first voice coil motor assembly (VCMA) comprising at least one first magnet coupled with a first magnet housing plate;
   a second head slider comprising a read-write head configured to write to and to read from a second disk medium;
   a second rotary actuator configured to move the second head slider to access portions of the second disk medium via actuation by a second voice coil motor assembly (VCMA) comprising at least one second magnet coupled with a second magnet housing plate;
   an enclosure base; and
   a central support plate directly fastened to and in direct contact with the enclosure base and positioned between the first magnet housing plate of the first VCMA and the second magnet housing plate of the second VCMA.

2. The data storage device of claim 1, wherein the central support plate is fastened to the enclosure base with a respective fastener at a plurality of locations.

3. The data storage device of claim 2, wherein the central support plate is fastened to the enclosure base with a screw at each of at least three threaded-receptacle locations of the enclosure base.

4. The data storage device of claim 2, wherein the central support plate is further fastened to the second VCMA at one or more locations.

5. The data storage device of claim 1, wherein the central support plate is further fastened to the second VCMA at one or more locations.

6. The data storage device of claim 1, wherein the first VCMA is fastened to a device cover at one or more locations.

7. The data storage device of claim 1, wherein the first VCMA is fastened to the enclosure base at one or more locations.

8. The data storage device of claim 1, wherein the enclosure base has a height greater than one inch for enclosing the first and second rotary actuators.

9. A method of assembling a multi-actuator assembly in a hard disk drive, the method comprising:
- positioning within an enclosure base of the hard disk drive a lower rotary actuator comprising a lower voice coil motor assembly (VCMA) comprising at least one lower magnet coupled with a lower magnet housing plate;
- positioning a support plate within the enclosure base and onto the lower magnet housing plate of the lower rotary actuator;
- fastening the support plate directly to and in direct contact with the enclosure base by inserting a respective fastener at each of one or more locations; and
- positioning within the enclosure base and onto the support plate an upper rotary actuator comprising an upper voice coil motor assembly (VCMA) comprising at least one upper magnet coupled with an upper magnet housing plate.

10. The method of claim 9, wherein positioning the upper rotary actuator onto the support plate includes positioning the upper magnet housing plate directly onto the support plate.

11. The method of claim 9, wherein fastening the support plate includes fastening the support plate to the enclosure base with a respective fastener at a plurality of locations.

12. The method of claim 11, further comprising:
- prior to positioning the upper rotary actuator, attaching the support plate to the lower VCMA at one or more locations.

13. The method of claim 9, further comprising:
- prior to positioning the upper rotary actuator, attaching the support plate to the lower VCMA at one or more locations.

14. The method of claim 9, further comprising:
- attaching the upper VCMA to a cover at one or more locations.

15. The method of claim 9, further comprising:
- attaching the upper VCMA to the enclosure base at one or more locations.

16. The method of claim 9, wherein the enclosure base has a height greater than one inch for enclosing the lower and upper rotary actuators.

17. A multi-actuator hard disk drive (HDD) comprising:
- a plurality of disk media rotatably mounted on a spindle;
- a multi-actuator system comprising:
  - a first plurality of head sliders each housing a read-write transducer configured to read from and to write to at least one disk medium of the plurality of disk media;
  - first means for moving the first plurality of head sliders to access portions of the disk media;
  - a second plurality of head sliders each housing a read-write transducer configured to read from and to write to at least one disk medium of the plurality of disk media;
  - second means for moving the second plurality of head sliders to access portions of the disk media;
- an enclosure base; and
- directly mechanically attached to and in contact with the enclosure base, means for stiffening the multi-actuator system at an interface of the means for moving the first plurality of head sliders and the means for moving the second plurality of head sliders to restrict tilting and/or rocking motion of the means for moving the first and second plurality of head sliders.

18. The multi-actuator HDD of claim 17, wherein the means for stiffening is further attached to the second means for moving at one or more locations.

19. The multi-actuator HDD of claim 17, wherein the means for stiffening is mechanically attached to the enclosure base at a plurality of sidewalls of the enclosure base.

20. The multi-actuator HDD of claim 17, wherein the enclosure base has a height greater than one inch.

* * * * *